Aug. 12, 1952 — E. T. JAGGER — 2,606,779
BUSH FOR SEALING ROTARY SHAFTS
Filed March 29, 1950 — 2 SHEETS—SHEET 2

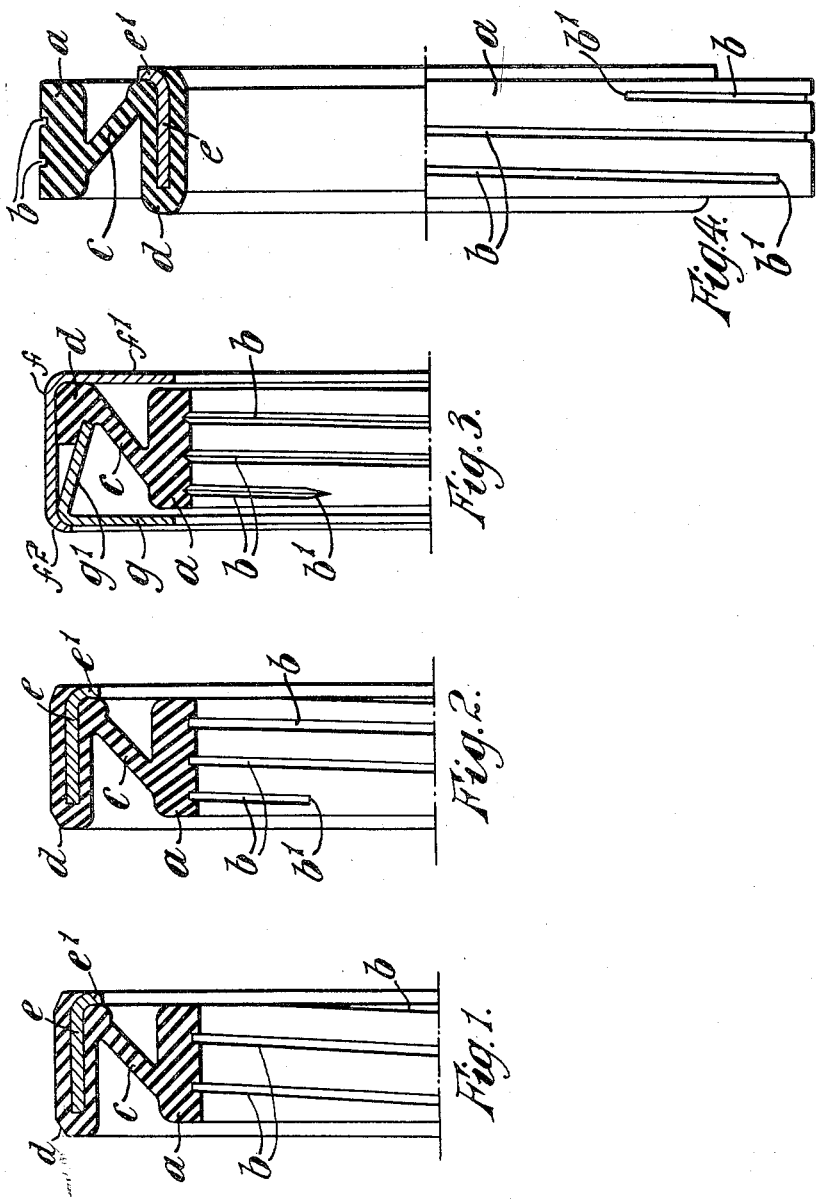

INVENTOR
ERNEST T. JAGGER
BY Francis E. Boyes
ATTORNEY

Patented Aug. 12, 1952

2,606,779

UNITED STATES PATENT OFFICE 2,606,779

BUSH FOR SEALING ROTARY SHAFTS

Ernest Thornton Jagger, Newcastle-upon-Tyne, England, assignor to George Angus and Company Limited, Newcastle-upon-Tyne, England Application March 29, 1950, Serial No. 152,537
In Great Britain April 7, 1949

3 Claims. (Cl. 288—3)

This invention relates to bushes for sealing rotary shafts.

It is known to provide a metal or a rubber bush around a shaft and to form one of these with a helical groove, so that when they are relatively rotated, oil is fed by the helical groove in an axial direction depending on the direction of rotation and the direction of helical advance of the helical groove.

It is obvious that instead of a helically grooved bush being helically grooved on its inner periphery and coacting with a surface on a shaft, it may be helically grooved on its outer periphery to coact with a surface of the shaft housing and be fitted on and to turn with the shaft.

It is usual for a helically grooved metal bush to be mounted rigidly, the necessary allowance for machining tolerances and for oscillatory or eccentric movement of a rotating shaft precluding the bush from being fitted with the minimum clearance on the shaft desirable to achieve the best sealing results.

However it has been proposed to provide a rubber bush with a helical groove or thread, or a pair of such helices of opposite hand, and to connect the bush to an attaching flange or mounting annulus by a plane radial web of thin section to permit limited radial and axial movements of the bush to accommodate misalignment and minor movements of the shaft to be sealed.

The present invention provides an improved construction for helically grooved bush seals by interconnecting a pliant bush and its mounting by a frusto-conical radially extending resilient web.

With an internally helically grooved bush embracing a rotary shaft and the rigid mounting fitted with an interference press fit in, or otherwise secured to, the shaft housing, the frusto-conical resilient web will permit the bush to conform to all oscillatory or eccentric movements of the shaft, so that the clearance between the bush and the shaft can be the bare minimum necessary to permit the shaft to turn freely. Similarly with an externally helically grooved bush, the clearance between the latter and the shaft housing can be the bare minimum to permit the bush to turn freely in the housing.

The web may be composed of oil-resistant synthetic rubber and may be concentrically corrugated. However, a corrugated thin metal web may be employed.

Preferably and conveniently both the helically grooved bush and its resilient web are integrally moulded of rubber, which for most seals is oil-resistant synthetic rubber.

The helical groove may be stopped intermediate the ends of the bush for instance near one or both ends thereof, in order to obstruct the flow of oil along the groove when the level of the oil is above the top of a horizontal shaft and the shaft is not rotating.

The helically grooved resiliently mounted non-rigid shaft-sealing bush can be provided with helical grooving which will oppose the escape of oil past the bush whatever be the direction of rotation of the shaft. For this purpose the non-rigid bush, connected by a radially extending resilient web to a mounting, is moulded on a periphery with a helical groove extending between one end of the bush and a vent on the same side of the web and a helical groove of opposite helical direction extending between the other end of the bush and the vent.

Such a bush is located with the first-mentioned helical groove and the vent opening towards the space to be sealed.

Rotation of the shaft in one direction will cause the helical groove on the vented side of the web to exert a screw conveyor action opposing the flow of liquid, usually oil, past the bush. Rotation of the shaft in the opposite direction, whilst it will cause the helical groove on the vented side of the web to exert a screw conveyor action promoting the flow of liquid past the bush, will cause the other helical groove, which is of opposite helical direction, to exert a screw conveyor action to oppose the flow of liquid past the bush. The liquid between the adjacent ends of the two helical grooves will, by the opposing actions of the two helical grooves, thereby be placed under pressure and be discharged through the vent back into the space to be sealed.

If the level of the liquid, usually oil, in the space to be sealed is above the level of the bottom but not above the level of the top of a horizontal shaft, a close fitting bush with opposed open-ended helical grooves will prevent leakage of liquid past the bush when the shaft is not rotating, as the liquid to escape would have to ascend to the highest point of the helical grooves and therefore to above the shaft. However, if the level of the liquid is above the bottom of the shaft, it would, under its static head, enter through the vent into the space between the two helical groovings, both when the shaft is not rotating and also when the shaft is rotating in such a direction that both helical groovings extract liquid from such space. In the former case on the shaft rotating in the direction to cause both the helical groovings to extract liquid from the space between them, some of the liquid in such space would be conveyed past the bush to the end thereof remote from the space to be sealed. A non-return valve is therefore provided on the vent to prevent in-flow of liquid therethrough when the bush is to be used to seal liquid standing above the bottom of the shaft.

However, when the level of the liquid in the space to be sealed stands above the top of the horizontal shaft, liquid could leak along the open-ended helical groovings when the shaft is not rotating. To prevent such leakage, the helical groove of the bush remoter from the space to be sealed is interrupted, for instance this helical groove commences short of the respective end of the bush. The helical groove could be stopped at any point between, or even at both its ends. Also both helical grooves may be stopped.

One of the helical groovings, for instance the grooving which proceeds from the space to be sealed, may be formed to exert a greater screw conveyor effect than the other. For instance, one of the helical groovings may be of greater pitch or larger section than the other, or may be provided in multiple, like a multi-start screw thread.

Representative examples of resiliently mounted non-rigid oil seal bushes with moulded helical grooves, are shown in the accompanying drawings, in which:

Fig. 1 is a half axial section of a resiliently mounted non-rigid oil seal bush with an internal moulded helical groove.

Fig. 2 is a view exactly similar to Fig. 1 except that the internal moulded helical groove is stopped near one end of the bush.

Fig. 3 is a half axial section of a resiliently mounted non-rigid oil seal bush with an internal moulded helical groove stopped near one end of the bush, provided with a mounting consisting of a two-piece metal casing.

Fig. 4 is a half axial section and half side elevation of a resiliently mounted shaft housing oil seal bush with an external moulded helical groove stopped near both ends of the bush.

Referring more particularly to Figs. 1 and 2, $a$ is a rubber bush moulded on its inner periphery with a rectangular helical groove $b$. $c$ is a thin rubber web inclined conically, which integrally connects the rubber bush $a$ to a stout cylindrical rubber annulus $d$, stiffened by a cylindrical metal ring $e$ embedded in the rubber annulus $d$. The stiff rubber annulus $d$ is adapted to be fitted with an interference press fit in a shaft housing (not shown) of a rotary shaft (not shown) embraced by the rubber bush $a$. One end of the metal stiffening ring $e$, called an insert, is bent radially inwards to provide a narrow radial flange $e^1$, which is located outside the respective end of the rubber annulus $d$ as a facing against which a tool can be pressed to force the entire device into the shaft housing.

In the construction shown in Fig. 2, the moulded helical groove $b$ is stopped at $b^1$ short of one end of the rubber bush $a$.

Instead of the sealing device being an interference press fit by means of a stiffened rubber annulus, the rubber web $c$ can be secured in a two-piece metal casing $f$, $g$, as shown in Fig. 3. This casing consists of a pressed sheet metal cylindrical casing $f$, having a radially inwardly directed flange $f^1$, in which the outer peripheral border of the rubber web $c$ is nipped by the border of an axially directed conical flange $g^1$ of a radial annular closure disc $g$, held by the beaded-over border $f^2$ of the cylindrical casing $f$. Both the radial flange $f^1$ of the casing $f$ and the annular closure disc $g$ overlap the helically grooved non-rigid rubber bush $a$, and thus limit axial displacement of such bush in either direction if subjected to unbalanced permissible light oil pressure on either side.

The helical groove $b$ of the sealing device shown in Fig. 3 is of V cross section and is stopped at $b^1$ near one end of the bush $a$.

In Fig. 4 a sealing device is shown which is the inverse of the device shown in Figs. 1 and 2, except for its helical groove $b$ being stopped at $b^1$ near both ends of the bush $a$. The outer periphery of the non-rigid rubber bush $a$ is moulded with a rectangular helical groove $b$ and the inner periphery is integrally connected by an inclined conical annular rubber web $c$ to a rubber annulus $d$, stiffened by a metal insert $e$, at the radially inner periphery of the rubber web $c$. With this construction the stiffened rubber annulus $d$ is an interference press fit on, and rotates with, a shaft (not shown), whilst the helically grooved non-rigid rubber bush $a$ co-operates with a machined bore of the shaft housing (not shown).

Figure 6:
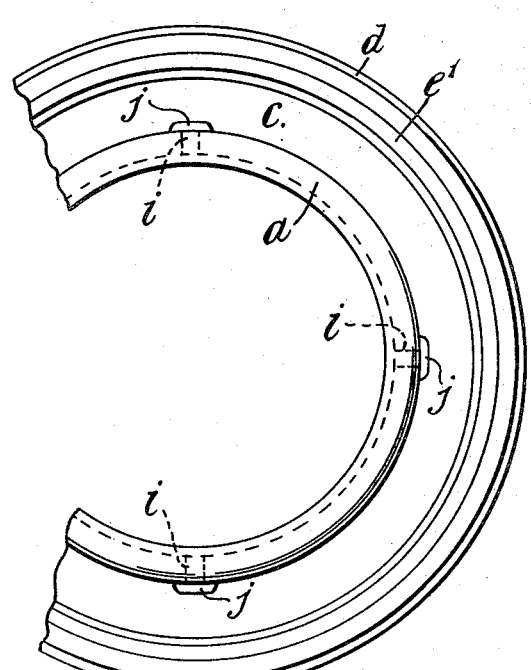
Fig. 6 is a broken end view of one construction of bush.
Figure 5:
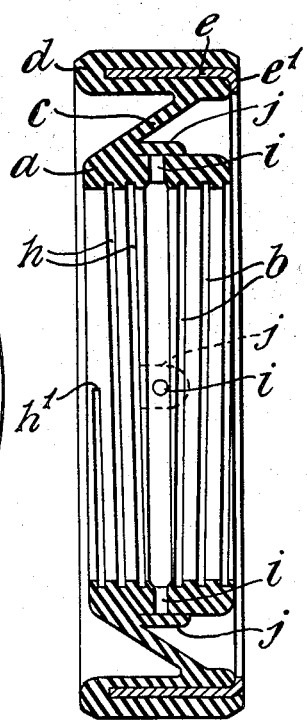
Fig. 5 is an axial section.

In the construction shown in Figs. 5 and 6, $a$ is a bush of rubber integrally moulded with a radially extending conically inclined web $c$, likewise integrally moulded with a rubber annulus $d$, stiffened by a metal ring $e$ embedded therein. The rubber bush $a$ is moulded on its inner periphery with a helical groove $b$ extending completely from one end thereof to about the mid-length of the bush $a$. From there, a second moulded helical groove $h$, of opposite helical direction to the helical groove $b$, extends almost to the other end of the bush $a$, but is stopped at $h^1$ short of such end.

The space between the adjacent ends of the two helical grooves $b$ and $h$, is vented by holes $i$, formed through the bush $a$. Owing to the conicity of the web $c$, the holes $i$, although formed at the mid-length of the bush $a$, open on the same side of the web $c$ as the helical groove $b$.

The outer end of each hole $i$ is covered by a rubber flap $j$, serving as a non-return valve.

These flaps $j$ are initially moulded as bosses on the outer periphery of the bush $a$, and are formed into flaps by being partially severed, by a knife, from the bush.

Figure 8:
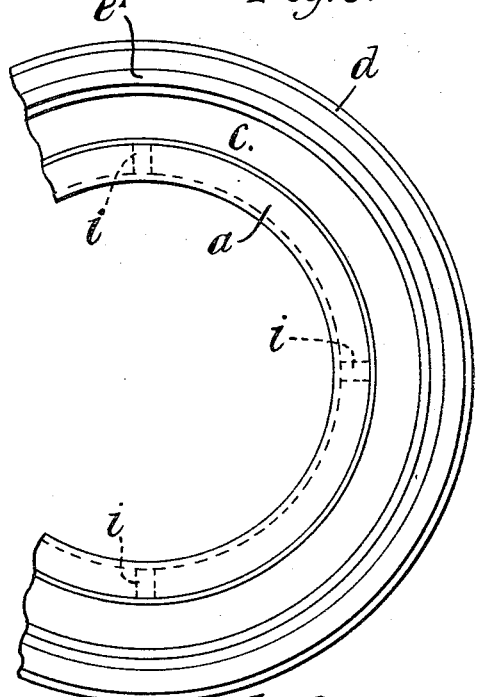
Figs. 7 and 8 are views similar to Figs. 5 and 6 of another construction of bush.
Figure 7:
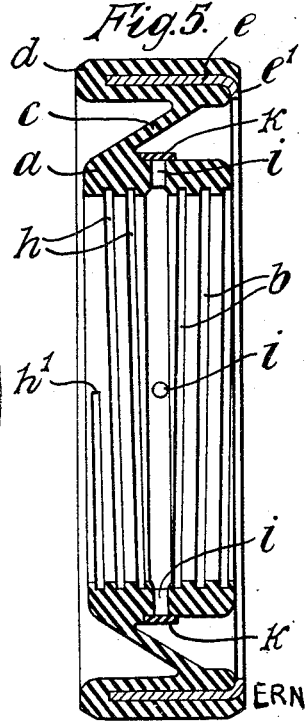

In the construction shown in Figs. 7 and 8, the non-return valves are formed by a rubber band $k$, embracing the bush $a$ and covering the holes $i$. To prevent displacement, one border of the rubber band $k$ may be cemented to the bush $a$.

Although an internally helically grooved bush with opposed helical grooves is shown by way of example, similar opposed helical grooves can be moulded on the outer periphery of a bush to coact with a shaft housing.

To ensure minimum clearance between the bush $a$ and the shaft (not shown) which it is to seal, the eye of the non-rigid bush $a$ is initially of slightly less diameter than the shaft, and the bush itself is so elastically pliant that it can be stretched over the shaft, and initially is an interference fit thereon. In such case the minimum clearance is produced by the thin film of oil which, during use, will be drawn between the co-operating surfaces, or the minimum clearance is produced by the eventual permanent set of or by the wear of, the rubber, or by a combination of these effects.

I claim:

1. A sealing device for a rotary shaft, consisting of a pliant bush formed with a vent and moulded on a periphery with a helical groove extending between one end of said bush and said vent and with another helical groove of opposite helical direction to said first-mentioned helical groove and extending between the other end of said bush and said vent, an annular mounting coaxial with said bush, a radially extending resilient web interconnecting said bush and said mounting on one side of said vent and non-return valve means on said vent opening away from said helically grooved periphery of said bush.

2. A sealing device for a rotary shaft, consisting of a pliant rubber bush formed with a vent and moulded on a periphery with a helical groove extending between one end of said bush and said vent and with another helical groove of opposite helical direction to said first-mentioned helical groove and extending between the other end of said bush and said vent, an annular mounting coaxial with said bush, a radially extending resilient rubber web interconnecting said rubber bush and said mounting on one side of said vent and integral with said rubber bush, and non-return valve means on said vent opening away from said helically grooved periphery of said bush.

3. A sealing device for a rotary shaft, consisting of a pliant rubber bush formed with a vent and moulded on a periphery with a helical groove extending between one end of said bush and said vent and with another helical groove of opposite helical direction to said first-mentioned helical groove and extending between the other end of said bush and said vent, a stiff rubber annular mounting coaxial with said bush, a radially extending resilient rubber web interconnecting and integral with said bush and said mounting on one side of said vent, and non-return valve means on said vent opening away from said helically grooved periphery of said bush.

ERNEST THORNTON JAGGER.

REFERENCES CITED

The following references are of record in the file of this patent:

UNITED STATES PATENTS

| Number | Name | Date |
| --- | --- | --- |
| 1,493,598 | Buckwalter | May 13, 1924 |
| 2,092,237 | Antonelli et al. | Sept. 7, 1937 |
| 2,175,868 | Bentley | Oct. 10, 1939 |
| 2,181,203 | Reynolds | Nov. 28, 1939 |
| 2,316,713 | Procter | Apr. 13, 1943 |
| 2,446,380 | Meyers et al. | Aug. 3, 1948 |
| 2,487,177 | Pollock | Nov. 8, 1949 |